J. WRIGHTSON.
Thrashing Machine.
No. 1,153.                                                                 Patented May 17, 1839.
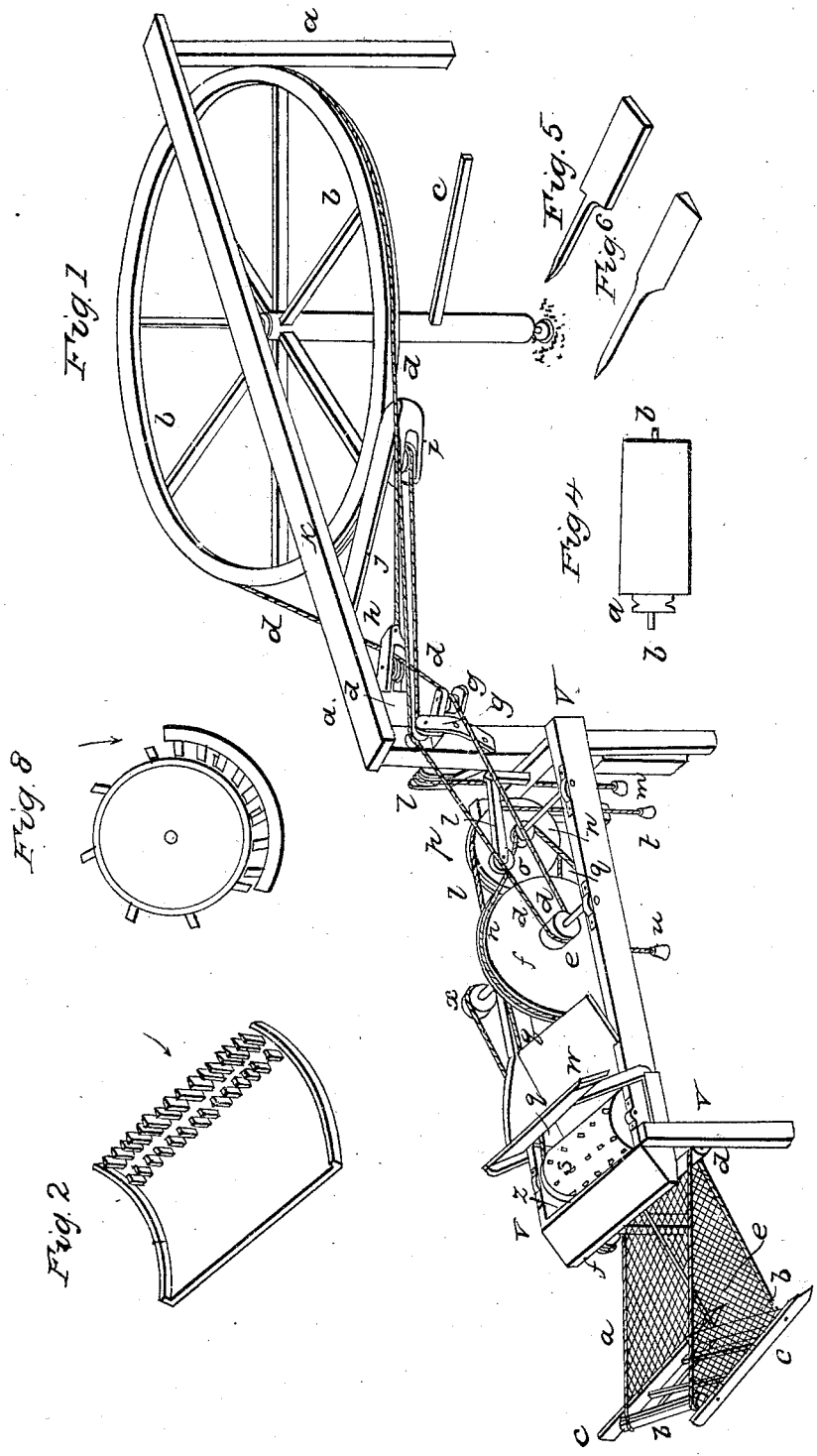

UNITED STATES PATENT OFFICE.

JEREMIAH WRIGHTSON, OF DORCHESTER COUNTY, MARYLAND.

TEETH OF THRESHING-MACHINES.

Specification of Letters Patent No. 1,153, dated May 17, 1839.

*To all whom it may concern:*

Be it known that I, JEREMIAH WRIGHTSON, of Dorchester county and State of Maryland, have invented a new and useful Improvement in Threshing-Machines for All Kinds of Grain; and I do hereby declare that the following is a full and exact description.

I shall premise the description, by recommending the horse power represented in Figure 1 of the accompanying drawing.

Fig. 2 represents pulleys to get up speed. Fig. 2 is hopper of thresher to introduce grain. S, is the beating cylinder. V, V, V, frame of the thresher. $r$, $q$, is a pulley attached to the side of the cylinder as represented at Fig. 4, which represents the cylinder without teeth. I propose to make the cylinder by turning it and the pulley $a$, of one solid piece, or to attach the pulley immediately to the cylinder, to prevent the necessity of a separate attachment to the shaft $b$, $b$, of the cylinder, in which case the pulley will be secure and render them much cheaper, and more readily made where facilities are not at hand, the pulley being inside of the bearing of the journals $b$, $b$. This pulley has a deep V groove in which the band or rope turns.

Fig. 5 represents the form of the teeth in the beater being about ¼ of an inch thick and an inch broad, to project two inches. The teeth being thin will pass freely through the straw, whereas blunt one would bend the straw and clog. I propose 6 rows on the cylinder, but there may be 8 or more if it is 15 inches diameter. The teeth being thin will give more room in a given length of cylinder. I propose to use the same form of tooth in the concave or bed except the front row which are formed as represented in Fig. 6; they are made of steel and sharp in front to cut off all straw that enters cross-wise, or would double round if the teeth were not sharp.

Fig. 7 represents the bed with one row of teeth like represented at Fig. 5, (but the bed may have from 3 to 6 or more rows and the front row of sharp teeth, as shown in Fig. 6. If the teeth are not sharp the straw must wear off before the tooth will be freed. The teeth in both the beater and concave may incline a little backward to free them from the straw more readily than if they projected in radii from the center.

Fig. 8, represents an end view of the beater and the concave and the position or inclination of the teeth.

Fig. 3 represents an apparatus for carrying off the straw to any distance or height required. It is made of netting or other suitable material, or form, supported by ropes or straps; or it may be a belt, and which ropes $a$, $a$, pass around the rollers $b$, $b$, on the inclined frame $c$, $c$, and around the roller $d$, which is supported by the legs of the frame of Fig. 2. The frame $c$, $c$, by its inclined position and weight resting on the points $e$, $e$, will keep the netting in proper position, for carrying off the straw over the upper roller, the grain at the same time falling through. This apparatus is put in motion by a rope passing around pulley $x$ on the shaft of wheel F, Fig. 2, and around pulley $f$, on the end of shaft of roller $d$, Fig. 3, this rope is crossed to give the requisite motion.

I claim—

The employment of the cutting teeth in the front row of the concave in the manner and for the purpose specified in the foregoing specification.

JEREMIAH WRIGHTSON.

Witnesses:
   MARCELLUS AARON,
   CALEB BELL.